(12) United States Patent
Qiu et al.

(10) Patent No.: US 12,421,671 B2
(45) Date of Patent: Sep. 23, 2025

(54) IN-SITU RECONSTRUCTION AND EXTENSION STRUCTURE OF EMBANKMENT AND CONSTRUCTION METHOD THEREOF

(71) Applicant: Changsha University of Science and Technology, Changsha (CN)

(72) Inventors: Xiang Qiu, Changsha (CN); Siqi Fan, Changsha (CN); Jiyuan Zhu, Changsha (CN); Xiaoming Fan, Changsha (CN); Jinhong Li, Changsha (CN)

(73) Assignee: Changsha University of Science and Technology, Changsha (CN)

( * ) Notice: Subject to any disclaimer, the term of this patent is extended or adjusted under 35 U.S.C. 154(b) by 200 days.

(21) Appl. No.: 18/372,420

(22) Filed: Sep. 25, 2023

(65) Prior Publication Data
US 2024/0352682 A1    Oct. 24, 2024

(30) Foreign Application Priority Data
Apr. 21, 2023  (CN) .......................... 202310434980.5

(51) Int. Cl.
*E02D 17/00*       (2006.01)
*E01C 3/04*        (2006.01)
(Continued)

(52) U.S. Cl.
CPC ................ *E01C 3/04* (2013.01); *E01C 3/06* (2013.01); *E02D 11/00* (2013.01); *E02D 17/18* (2013.01);
(Continued)

(58) Field of Classification Search
CPC ... E01C 3/04; E01C 3/06; E02D 11/00; E02D 17/18; E02D 17/207; E02D 2300/0032;
(Continued)

(56) References Cited

U.S. PATENT DOCUMENTS 3,822,557 A * 7/1974  Frederick .................. E02D 5/72
                                                  405/253
5,154,542 A * 10/1992 Klenert ............... E02D 29/0216
                                                  52/169.4

(Continued)

FOREIGN PATENT DOCUMENTS

CN       103046446 A  *  4/2013

*Primary Examiner* — Benjamin F Fiorello
(74) *Attorney, Agent, or Firm* — HEA Law PLLC; Darrin A. Auito

(57) ABSTRACT

An in-situ reconstruction and extension structure of an embankment and a construction method thereof are provided. The structure includes a stepped slope excavated on an existing side slope. A gradient of the stepped slope is the same as that of an extension side slope, the stepped slope is individually intersected with top and bottom planes of existing side slope; a toe of existing side slope is taken as a toe of the extension side slope, and gradient of the extension side slope is determined according to positions of the toe and an expanded width. An outer side of stepped slope is filled with a geogrid reinforcement layer in a layered manner, a slope protection structure is arranged on an outer side of the geogrid reinforcement layer to form extension equivalent side slope; a drainage system is arranged at a bottom of the extension side slope.

14 Claims, 6 Drawing Sheets

(51) Int. Cl.
*E01C 3/06* (2006.01)
*E02D 11/00* (2006.01)
*E02D 17/18* (2006.01)
*E02D 17/20* (2006.01)

(52) U.S. Cl.
CPC .... *E02D 17/207* (2013.01); *E02D 2300/0032* (2013.01); *E02D 2300/0037* (2013.01); *E02D 2300/0079* (2013.01); *E02D 2300/0085* (2013.01); *E02D 2600/30* (2013.01); *E02D 2600/40* (2013.01)

(58) Field of Classification Search
CPC .... E02D 1200/0037; E02D 2300/0079; E02D 2600/30; E02D 2600/40
See application file for complete search history.

(56) References Cited

U.S. PATENT DOCUMENTS

| | | | | |
|---|---|---|---|---|
| 5,333,971 | A * | 8/1994 | Lewis | E02D 5/28 |
| | | | | 405/281 |
| 6,612,779 | B1 * | 9/2003 | Scuero | E02B 3/10 |
| | | | | 405/116 |
| 2010/0129163 | A1 * | 5/2010 | Suematsu | E02D 29/025 |
| | | | | 405/262 |
| 2019/0127941 | A1 * | 5/2019 | Sydlik | E02D 5/04 |
| 2019/0376248 | A1 * | 12/2019 | Wilkinson | E02D 17/20 |
| 2023/0009242 | A1 * | 1/2023 | Zhang | E02D 5/808 |

* cited by examiner

IN-SITU RECONSTRUCTION AND EXTENSION STRUCTURE OF EMBANKMENT AND CONSTRUCTION METHOD THEREOF

CROSS-REFERENCE TO RELATED APPLICATION

This patent application claims the benefit and priority of Chinese Patent Application No. 202310434980.5 filed with the China National Intellectual Property Administration on Apr. 21, 2023, the disclosure of which is incorporated by reference herein in its entirety as part of the present application.

TECHNICAL FIELD

The present disclosure belongs to the technical field of highway side slopes, and relates to an in-situ reconstruction and extension structure of an embankment and a construction method thereof.

BACKGROUND

With the rapid development of society and economy as well as the gradual update of people's consumption concepts, automobiles currently become an indispensable transportation means in human society. Along with the increasing number of automobiles, traffic demands are continuously increased. However, most existing highways cannot adapt to the increasing traffic demands due to the limitations of early design concepts and design levels. In this case, upgrades to the original highways have become a research hotspot in the traffic field.

Currently, methods commonly used for highway extension include a geogrid splicing method or a method of anchoring in combination with geogrid splicing. The geogrid splicing method is to excavate old roadbed to form stepped surface, then to lay geogrid on the steps and to perform the fill for new roadbed, thereby realizing highway extension. However, in the traditional method, the embankment is needed to be excavated fully, which easily causes instability during construction, and further, engineering accidents may occur, and casualties are caused. The partial existing researches shows during highway extension, filling extension is carried out on the road parallel to the original side slope, additional land acquisition is needed, and the cost is increased. There is no corresponding solution for areas where the land acquisition for extension is not possible.

The Chinese invention patent publication CN102619150A discloses an anchoring type roadbed widening method, which adopts an anchor rod technology to strengthen an excavated old roadbed slope. Meanwhile, according to the fixed steel bars in the anchor rod connected with a geogrid, the geogrid is effectively prevented from sliding on steps of an old roadbed, the stabilities of both a new roadbed and an old roadbed are improved. However, after the anchor rod is adopted, the steel consumption is increased, and the construction cost is increased.

The Chinese invention patent publication CN107386031A discloses a treatment method of a joint for a highway reconstruction and extension engineering, which includes: excavating downwards and obliquely an existing side slope to form an inclined surface, paving a geogrid, arranging reinforcing ribs, and arranging gravel piles at a juncture of a new roadbed and an old roadbed to enable permanent support. The possibility of cracks between the new roadbed and the old roadbed is effectively reduced, but a construction site for driving the gravel piles is formed after a large range of excavation is carried out, so larger disturbance is caused to the primary embankment, and engineering accidents are easy to generate during construction.

In summary, the existing highway extension method has the following problems.
(1) In case that the embankment is expanded in an ex-situ manner, the land acquisition is limited, a large amount of land is wasted easily, and the land utilization rate is lower.
(2) The comprehensive excavation is easy to be instable and damaged during construction, and engineering accidents are caused.
(3) The measures such as anchor rods, reinforcing ribs, anti-slide piles and the like are adopted to match with the geogrid to splice the new roadbed and the old roadbed, and the engineering cost is higher.

SUMMARY

In order to solve the problems, the disclosure provides an in-situ reconstruction and extension structure of an embankment, which improves the stability, reduces uneven sedimentation, reduces the footprint, does not carry out comprehensive excavation, reduces the construction cost and solves the problems in the prior art.

Another object of the present disclosure is to provide a construction method of an in-situ reconstruction and extension structure of an embankment.

The technical scheme adopted by the disclosure is that the in-situ reconstruction and extension structure of an embankment, including a stepped slope, wherein the stepped slope is formed by excavation on an existing side slope, a gradient of the stepped slope is the same as a gradient of an extension side slope, the stepped slope is intersected with each of a top plane and a bottom plane of the existing side slope; a toe of the existing side slope is taken as a toe of the extension side slope, and the gradient of the extension side slope is determined according to a position of the toe and an expanded width of the extension side slope.

An outer side of the stepped slope is filled with a geogrid reinforcement layer in a layered manner, and a slope protection structure is arranged on an outer side of the geogrid reinforcement layer to form the extension side slope.

A drainage system is arranged at a bottom of the extension side slope and configured for draining water seepage inside in-situ reconstruction and extension structure of an embankment.

Further, excavation of the stepped slope starts from the toe of the existing side slope and extends towards an inner side of the embankment to divide the embankment into a plurality of sub-level construction areas; and before the excavation of the stepped slope, a top of a tail end of each of the plurality of sub-level construction areas has steel sheet piles punched therein and slip-casting pipes are prefabricated at a corner of the steel sheet piles.

Further, a fork-shaped geogrid is paved in soil layers of the geogrid reinforcement layer, the fork-shaped geogrid is vertically provided with a reinforcing part, first geogrids are arranged on two sides of the reinforcing part in a staggered manner, the first geogrids are paved between every adjacent two layers of the soil layers of the geogrid reinforcement layer, and the reinforcing part is paved upwards in a step shape and is matched with the stepped slope.

Further, a thickness of the reinforcing part is 2~3 times a thickness of each of the first geogrids.

Further, the gradient of the extension side slope ranges from 1:1.5 to 1:1.

Further, the slope protection structure includes the following content.

Hollow bricks arranged on the stepped slope at the outer side of the geogrid reinforcement layer in a staggered manner.

Second geogrids, wherein one end of each of the second geogrids is fixed inside a corresponding one of the hollow bricks, and an other end of the second geogrid extends into a corresponding one of soil layers of the geogrid reinforcement layer.

Further, diagonal corners, which are in contact with upper and lower adjacent ones of the hollow bricks respectively, of each of the hollow bricks are respectively provided with an upper overlapping structure and a lower overlapping structure that are extended vertically outwards.

Further, a temporary intercepting ditch is dug above top ends of the steel sheet piles, and waterproof geotextiles are paved on a surface of the existing side slope and on a surface of the temporary intercepting ditch.

Further, a soil boss is arranged on one side of the temporary intercepting ditch close to the steel sheet piles, and the soil boss is inclined by 3°~6° towards the temporary intercepting ditch; and the waterproof geotextiles are paved on the surface of the existing side slope, on a surface of the temporary intercepting ditch and on a surface of the soil boss.

Further, the drainage system includes the following contents.

A waterproof layer arranged on a surface of the stepped slope.

A gravel layer paved on a top of the waterproof layer.

A bottom drainage ditch arranged at a bottom of the embankment.

A construction method of an in-situ reconstruction and extension structure of an embankment includes the following steps.

S1, cleaning up an existing embankment, removing impurities on a surface of the existing side slope, making an auxiliary line parallel to the extension side slope from a top of the existing side slope, and dividing the embankment into a plurality of sub-level construction areas from the toe of the existing side slope taken as a starting point towards an inner side of the embankment.

S2, punching the steel sheet piles into the top of the tail end of one sub-level construction area, which is closest to the starting point, of the sub-level construction areas.

S3, excavating transversely and in steps the one sub-level construction area from top to bottom along the auxiliary line to form a section of the stepped slope, paving a waterproof layer on a surface of the section of the stepped slope, and paving a gravel layer on the waterproof layer.

S4, filling the geogrid reinforcement layer on the gravel layer in a layered manner, and installing the slope protection structure in a filling process.

S5, carrying out wet pre-sedimentation construction on backfill soil in the one sub-level construction area.

S6, pulling out the steel sheet piles in a segmented interval manner, simultaneously injecting slurry into gaps left after the steel sheet piles are pulled out through slip-casting pipes respectively, and stopping slip-casting when bottoms of the slip-casting pipes are flush with a top of the geogrid reinforcement layer constructed.

S7, constructing sequentially others of the sub-level construction areas from bottom to top according to steps S2~S6; when a horizontal distance between the sub-level construction areas and the top of the existing side slope is smaller than a horizontal advance distance, the steel sheet piles need not to be punched into the one sub-level construction area.

S8, tamping a portion of the geogrid reinforcement layer which has a distance 3 m~5 m from the top of the existing side slope.

S9, constructing a bottom drainage ditch at the bottom of the extension side slope.

Further, the S2 specifically includes the following contents.

S21, installing a guide frame at a top of the one sub-level construction area.

S22, forming a steel sheet pile section by connecting some of the steel sheet piles through locking parts between every two adjacent steel sheet piles of said some of the steel sheet piles, and repeating the operation of forming the steel sheet pile section to form multiple steel sheet pile sections, punching the steel sheet pile sections into the one sub-level construction area according to a step shape, setting a reserved segmented interval of 15 cm~30 cm between every adjacent two steel sheet pile sections, and punching the steel sheet piles into the one sub-level construction area by a depth of 6 m~8 m; prefabricating the slip-casting pipes at trapezoid vertex corners of the steel sheet piles respectively, and extending bottoms of the slip-casting pipes out of the steel sheet piles respectively.

S23, excavating a temporary intercepting ditch above the steel sheet piles, arranging a soil boss on one side, close to the steel sheet piles, of the temporary intercepting ditch, wherein the soil boss is inclined by 3°~6° towards the temporary intercepting ditch; paving waterproof geotextiles on the surface of the existing side slope, on the surface of the temporary intercepting ditch, and on the surface of the soil boss.

Further, paving the geogrid reinforcement layer and the slope protection structure in S4 includes: cleaning and leveling a lower bearing layer, paving and compacting a first inner soil layer at a set position of the lower bearing layer, paving a first geogrid at one side of a fork-shaped geogrid at a top of the first inner soil layer, paving a reinforcing part at the top of the first inner soil layer and a side surface of the first inner soil layer, paving a first outer soil layer at one side of the reinforcing part which is away from the stepped slope, compacting and trimming an outer side of the first outer soil layer for arranging hollow bricks, paving a second geogrid pre-buried in the hollow bricks to a preset position in the first outer soil layer, and secondarily filling and compacting to finish the first outer soil layer; paving the first geogrid at an other side of the fork-shaped geogrid at a top of the first outer soil layer; repeating above operations; filling the geogrid reinforcement layer in layers, and paving the reinforcing part upwards in a step shape to be matched with the stepped slope; arranging the hollow bricks on a stepped surface of the geogrid reinforcement layer in a staggered manner, mutually buckling adjacent upper and lower ones of the hollow bricks, and filling soil mixed with green planting seeds in the hollow bricks.

Further, in S3, excavation stages n of each of the sub-level construction areas is determined by a height h of the sub-level construction area and a vertical spacing r of the first geogrid in a following formula:

$$n = \frac{h}{t}.$$

Further, the first geogrid has a thickness t that ranges from 0.1 m to 1 m.

The beneficial effects of the disclosure are as follows.

(1) In the embodiment of the disclosure, the existing side slope is divided into a plurality of sub-level construction areas. The anchoring system, the drainage system and the fork-shaped geogrid with a specific structure are matched with each other, so that the whole reconstruction and extension are completed under the premise of high efficiency, safety and low cost and occupation reduction. The gradient of the side slope after extension is larger than that of the side slope before extension. Compared with the ex-situ extension of a roadbed, the limit of surrounding buildings and terrains on extension projects is reduced, and the cost of land acquisition is reduced.

(2) In embodiments of the disclosure, the steel sheet piles are used as temporary support in the divisional construction, and slip-casting is carried out in the process of pulling out the steel sheet piles. In this way, it may reduce the disturbance on a stable structure of an existing side slope in the process of excavation as well as horizontal and transverse displacement of the existing side slope caused by pulling out the steel sheet piles. Further, the temporary intercepting ditch, the waterproof geotextile and the like are arranged above the top end the steel sheet pile during construction, so that adverse effects on a side slope caused by rainfall during construction are reduced.

(3) In embodiments of the disclosure, the reconstruction and extension construction process of an embankment and the embankment in the usage period are fully protected. In this way, the safety of the side slope of the embankment in the construction period and the usage period can be greatly improved, thus achieving the aim of safe construction. In addition, the problem that instability damage and engineering accidents are easily caused by comprehensive excavation during construction is solved.

(4) The anchor rods, the reinforcing ribs and the anti-slide piles, which are widely applied in the conventional reconstruction and extension technology for the embankment, are cooperated with the geogrid to splice the new roadbed and the old roadbed. The interface between the new roadbed and the old roadbed adopts comprehensive excavation in a step form, so that the excavation area is larger and the related range is wider. Compared with the common geogrid, the fork-shaped geogrid is reinforced in the vertical direction thereof, and the problem that the embankment possibly slides between two layers of geogrids is solved. Meanwhile, the weak positions of the boundary between the filling part and the digging part of the embankment are accurately reinforced through the fork-shaped geogrids, so that the labor cost and the material cost caused by paving a large number of geogrids are reduced.

(5) In the embodiment of the disclosure, the wet and pre-sedimentation construction is carried out on backfill soil in the sub-level construction areas, thereby greatly reducing sedimentation after a new roadbed is constructed, and reducing non-uniformity of sedimentation of the new roadbed and the old roadbed.

BRIEF DESCRIPTION OF THE DRAWINGS

In order to more clearly illustrate the embodiments of the disclosure or the technical solutions in the prior art, the drawings that are required in the embodiments or the description of the prior art will be briefly described. It is obvious that the drawings in the following description are only some embodiments of the disclosure, and that other drawings may be obtained according to these drawings without inventive effort for a person skilled in the art.

Figure 1:
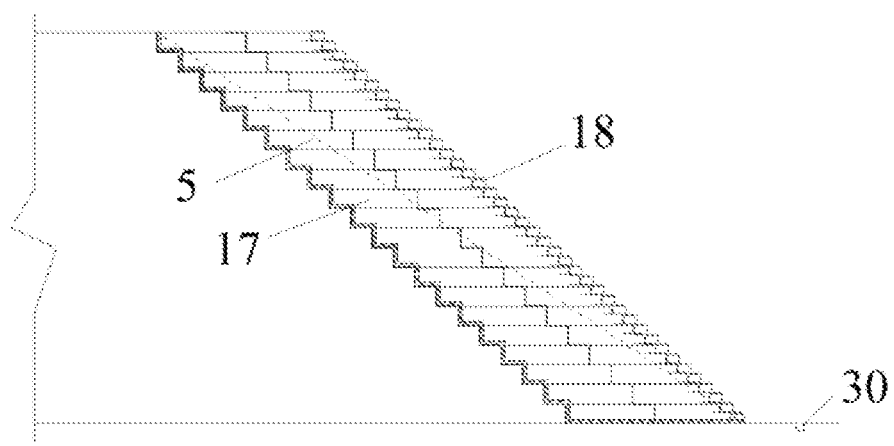
FIG. 1 is a general side view of an in-situ reconstruction and extension structure of an embankment according to an embodiment of the disclosure.

In the drawings: 1 first sub-level construction area; 2 second sub-level construction area; 3 third sub-level construction area; 4 fourth sub-level construction area; 5 existing side slope; 6 extension equivalent side slope; 7 steel sheet pile; 8 slip-casting pipe; 9 reserved segmented interval; 10 guide frame; 11 temporary intercepting ditch; 12 soil boss; 13 waterproof geotextile; 14 stepped slope; 15 waterproof layer; 16 gravel layer; 17 geogrid reinforcement layer; 18 slope protection structure; 19 first geogrid; 20 reinforcing part; 21 hollow brick; 22 second geogrid; 23 soil; 24 green plant; 25 upper overlapping structure; 26 lower overlapping structure; 27 water supply pipe; 28 spray head; 29 tamped area; 30 bottom drainage ditch; 31 sub-level construction area division start point.

DETAILED DESCRIPTION OF THE EMBODIMENTS

The technical solutions of the embodiments of the present disclosure will be clearly and completely described below in conjunction with the embodiments of the present disclosure. It is apparent that the described embodiments are only some embodiments of the present disclosure, and not all embodiments. All other embodiments, which can be made by those skilled in the art based on the embodiments of the disclosure without any inventive effort, are intended to be within the scope of the disclosure.

Example 1

An in-situ reconstruction and extension structure of an embankment, as shown in FIG. 1, includes a stepped slope 14 excavated on an existing side slope 5. The gradient of the stepped slope 14 is the same as that of an extension side slope, and the stepped slope 14 is individually intersected with the top and bottom planes of the existing side slope 5. The gradient of the extension side slope is determined according to the position of the toe and the extension width of the extension side slope, and the toe of the existing side slope 5 is used as the toe of the extension side slope. The outer side of the stepped slope 14 is filled with a geogrid reinforcement layer 17 in a layered manner, and a slope protection structure 18 is arranged on the outer side of the geogrid reinforcement layer 17 to form an extension side slope.

The excavation of the stepped slope 14 takes a sub-level construction area division starting point 31 as a starting point, and a certain horizontal distance towards the inner side of an embankment is taken to divide the embankment into multiple sub-level construction areas. Before the stepped slope 14 is excavated, steel sheet piles 7 are driven into the top of the tail end of the corresponding sub-level construction area, slip-casting pipes 8 are prefabricated at the top corners of the steel sheet piles 7 respectively, a temporary intercepting ditch 11 is dug above the top end of the steel sheet pile 7, water-proof geotextiles 13 are paved on the surface of the existing side slope 5 and the surfaces of the temporary intercepting ditches 11, a soil boss 12 is arranged on one side, close to the steel sheet pile 7, of the temporary intercepting ditch 11, and the soil boss 12 inclines by 3°~6° towards the temporary intercepting ditch 11.

The geogrid reinforcement layer 17 is an area surrounded by the bottom surface of the embankment, the road pavement, the excavated stepped slope 14 and the stepped surface of the extension side slope. The geogrid reinforcement layer 17 and the slope protection structure 18 form an anchoring system, and the steel sheet piles 7, the temporary intercepting ditches 11 and the waterproof geotextiles 13 form a temporary support and protection system. The bottom of the extension side slope is provided with a drainage system for draining water seepage inside the in-situ reconstruction and extension structure of an embankment. The anchoring system, the drainage system and the temporary support and protection system are mutually operated.

Figure 7:
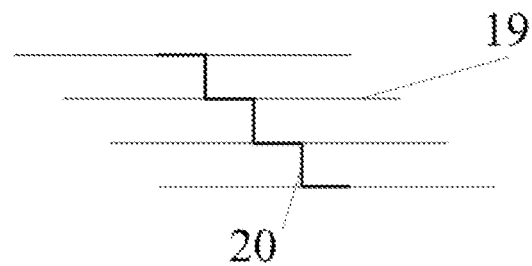
FIG. 7 is a side view of a fork-shaped geogrid after being paved according to an embodiment of the disclosure.
Figure 8:
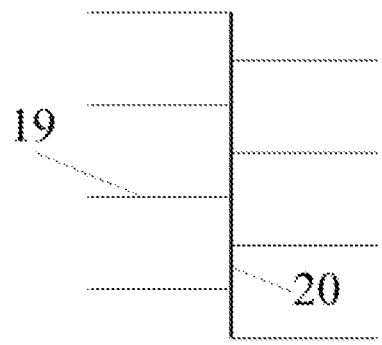
FIG. 8 is a side view of an ex-factory fork-shaped geogrid according to an embodiment of the present disclosure.
Figure 9:
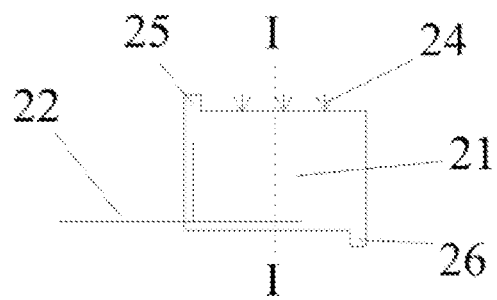
FIG. 9 is a side view of a slope protection structure according to an embodiment of the disclosure.
Figure 10:
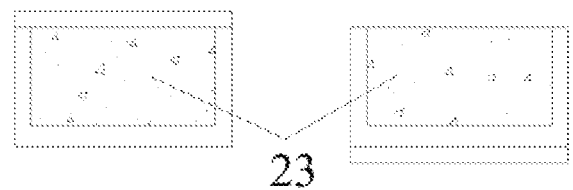
FIG. 10 is a sectional view taken along line I-I of FIG. 9.

In some embodiments, a fork-shaped geogrid is paved in the soil layer of the geogrid reinforcement layer 17. As shown in FIGS. 7-8, the fork-shaped geogrid is vertically provided with a reinforcing part 20, two sides of the reinforcing part 20 are arranged with respective first geogrids 19 in a staggered manner. The first geogrids 19 are paved between adjacent two of soil layers in the geogrid reinforcement layer 17, and the reinforcing part 20 is paved upwards in a step shape and matched with the stepped slope 14. The fork-shaped geogrid increases the shear strength of the embankment and avoids the instability and damage of the embankment.

The first geogrid 19 is a common geogrid, and the thickness of the reinforcing part 20 is 2~3 times of the thickness of the first geogrid 19. The width of the single first geogrid 19 is preferably 6 m, the ultimate tensile strength of the single first geogrid 19 is not less than 80 kN/m, and an overlapping length between two first geogrids 19 along a longitudinal direction of the embankment is not less than 0.5 m.

As shown in FIGS. 1 and 9-11, the slope protection structure 18 includes hollow bricks 21 and a second geogrid 22. The hollow bricks 21 are arranged on the stepped slope outside the geogrid reinforcement layer 17, and the opposite angles of each hollow brick 21, which are in contact with the upper and lower adjacent hollow bricks 21, are respectively provided with an upper overlapping structure 25 and a lower overlapping structure 26 which extend vertically outwards. Soil 23 mixed with green plant seeds is filled in the hollow bricks 21, so that green plants 24 can grow. One end of the second geogrid 22 is pre-buried in the hollow brick 21, and the other end of the second geogrid 22 extends into the soil layer of the geogrid reinforcement layer 17. The second geogrid 22 can be a steel-plastic geogrid with an ultimate tensile strength of not less than 80 kN/m.

The hollow brick 21 has a height of 0.28 m, a width of 0.335 m, and a length of 0.4 m. The upper and lower overlapping structures 25 and 26 are rectangular solids of 0.03 m×0.03 m×0.4 m, a wall thickness of a bottom of an inner recess of the hollow brick 21 is 0.04 m, a thickness of a wall of the hollow brick which is close to the upper overlapping structure 25 is 0.06 m, and thicknesses of the other three walls of the hollow brick are 0.03 m.

The hollow brick 21 has the main function of protecting the slope and preventing the slope from being washed by rain water. Meanwhile, the hollow brick 21 has the function of preventing rainwater from permeating into the embankment, and can be planted with green plants to beautify the side slope. The hollow brick 21 may be replaced by a structure having the same function as itself.

In some embodiments, the drainage system includes a waterproof layer 15, a gravel layer 16 and a bottom drainage ditch 30. The waterproof layer 15 is arranged on a surface of the stepped slope 14, and the waterproof geotextile is adopted for the waterproof layer 15. The gravel layer 16 is paved on the waterproof layer 15. The bottom drainage ditch 30 is arranged at a bottom of the embankment.

In some embodiments, the horizontal plane of the stepped slope 14 is excavated at an angle of 3°~6° towards the outer side of the embankment in the transverse direction, and is excavated at an angle of 2°~5° in the longitudinal direction, so that water in the wet sedimentation construction process is quickly discharged. A height of the stepped slope 14 is the paving thickness t of the first geogrid 19.

The upper surfaces of all the hollow bricks 21 on the surface of the geogrid reinforcement layer 17 are integrally arranged at a slope angle of 3°~6° in the transverse direction, and the upper surfaces of the hollow bricks 21 are arranged at a slope angle of 2°~5° in the longitudinal direction, so that rainwater falling on the surface of the embankment can be quickly guided away.

Example 2

A construction method of the in-situ reconstruction and extension structure of an embankment includes the following steps.

In step S1, a primary embankment is cleaned up, impurities on a surface of the existing side slope are removed, an extension width of the embankment is determined to be 4 m, an auxiliary line parallel to the extension equivalent side slope 6 from a top of the existing side slope is made, the embankment is divided into multiple sub-level construction areas from the intersection of the auxiliary line and a slope bottom plane as a sub-level construction area division starting point 31 towards the inner side of the embankment and by a certain horizontal advance distance; due to considering stability of the embankment and engineering construction efficiency, a horizontal advance distance is taken as 3 m; and both the stepped slope 14 and the first geogrid 19 are paved along this auxiliary line. If the toe of the primary embankment is taken as a starting point, the horizontal advance distance of the first sub-level construction area 1 is taken as 7 m, and the advance distances of the rest sub-level construction areas are taken as 3 m. The advance distance of the first sub-level construction zone 1 needs to take the extension width into account.

Figure 2:
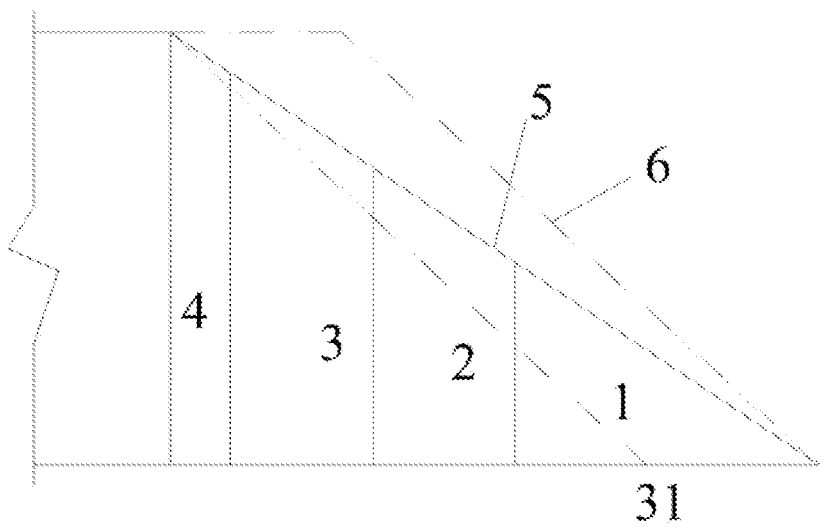
FIG. 2 is a view showing division of sub-level construction areas of an existing side slope according to an embodiment of the present disclosure.

In step S2, as shown in FIG. 2, the construction area is divided into a first sub-level construction area 1, a second sub-level construction area 2, a third sub-level construction area 3, and a fourth sub-level construction area 4 in this order from the toe to the inside of the embankment. The sub-level construction areas are divided based on the position where the steel sheet piles 7 need to be driven. When the sectional distance between the steel sheet piles 7 on the embankment is smaller, the stability of the embankment is higher during construction, and the construction efficiency is lower; and the larger the distance is, the higher the construction efficiency is, and the lower the stability of the embankment during construction is. After comprehensively considering the stability and the construction efficiency of the embankment during construction, the sectional distance between the steel sheet piles on the embankment is selected to be 3 meters.

Figure 3:
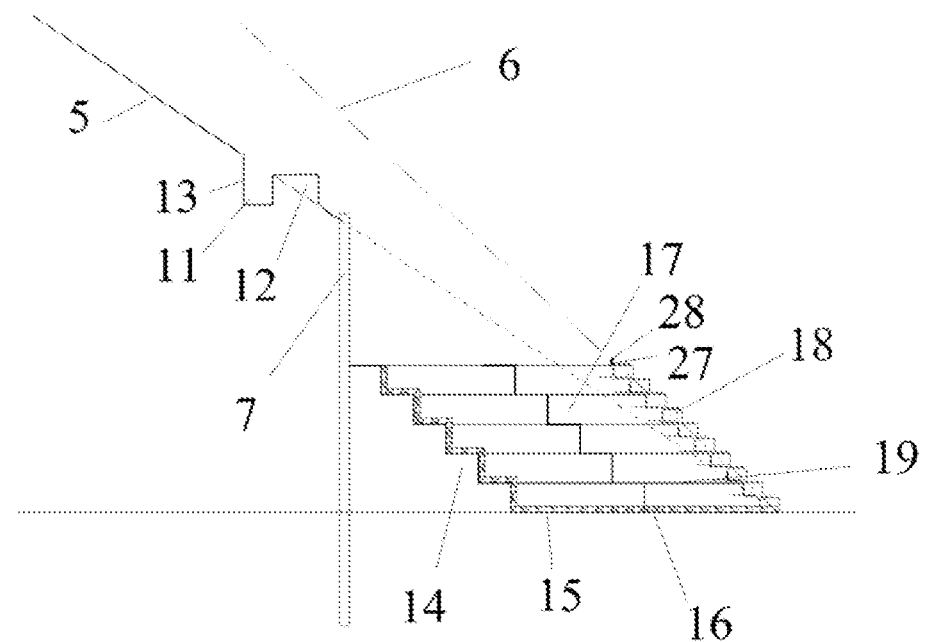
FIG. 3 is a side view of a first sub-level construction area under construction in accordance with an embodiment of the present disclosure.
Figure 4:
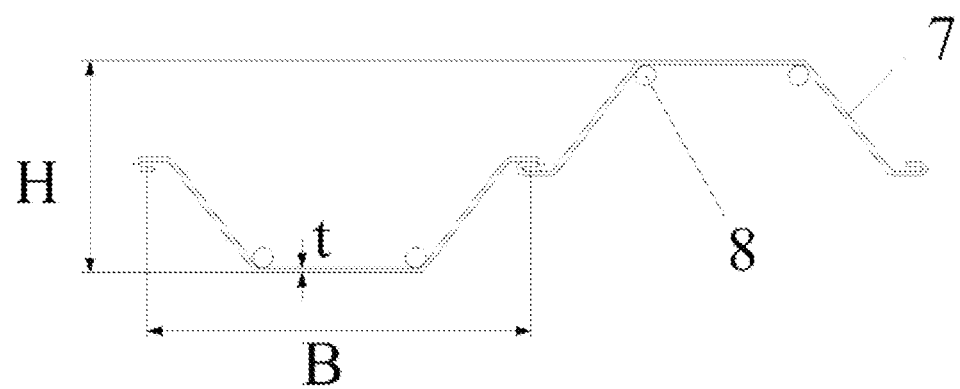
FIG. 4 is a top view of steel sheet piles driven in a stepped manner according to an embodiment of the present disclosure.
Figure 5:
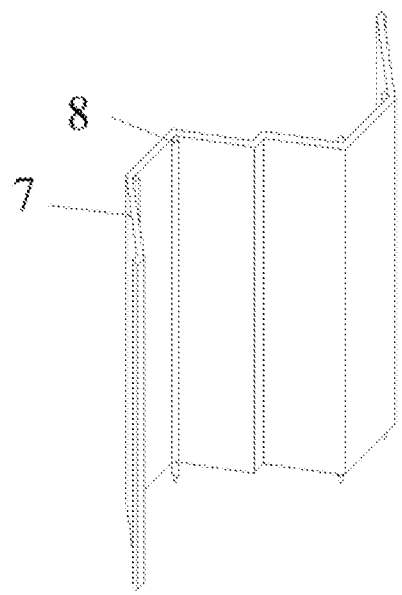
FIG. 5 is a perspective view of the steel sheet piles driven in the stepped manner according to an embodiment of the present disclosure.

As shown in FIG. 3, steel sheet piles 7 are driven into the top of the first sub-level construction area 1, a temporary intercepting ditch 11 is excavated above the top end of the steel sheet pile 7, and waterproof geotextiles 13 are paved on the surfaces of the existing side slopes 5 and the temporary intercepting ditches 11. The concrete operation is as follows.

In step S21, a guide frame 10 is installed at the top of the first sub-level construction area 1.

Figure 6:
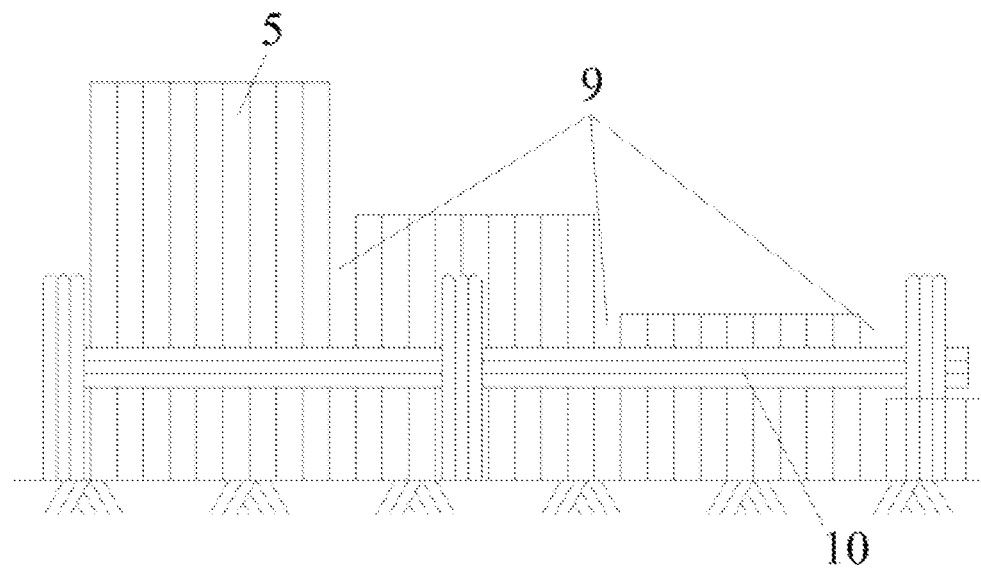
FIG. 6 is a schematic view of construction of driving a steel sheet pile according to an embodiment of the present disclosure.

In step S22, for convenience in construction, as shown in FIGS. 4-5, 10 to 20 of steel sheet piles 7 are connected as a steel sheet pile section through locking parts between every two adjacent steel sheet pile 7 are connected, and the operation of forming the steel sheet pile section is repeated to form multiple steel sheet pile sections, and the steel sheet pile sections are driven in a stepped manner by using equipment such as a three-fulcrum guide-rod-type crawler pile driver, a vibration hammer and the like. A reserved segmented interval 9 of 15 cm~30 cm is set between every adjacent two of steel sheet pile sections. As shown in FIG. 6, the driving depth of the steel sheet pile 7 is 6 m~8 m. Slip-casting pipes 8 are prefabricated at the two trapezoid vertex angles of the steel sheet piles 7 respectively through welding. The bottoms of the slip-casting pipes 8 extend out of the bottoms of the steel sheet piles 7 by 0.3 m. The slip-casting pipe 8 adopts a steel pipe with an inner diameter of 19 mm~38 mm and the wall thickness of not less than 5 mm. The tip of the steel pipe adopts a cone with screw threads connected with the slip-casting pipe 8. Four rows of holes which are staggered are arranged at a position which has 0.2 m distance from the bottom end of the slip-casting pipe 8. The distance between holes is about 50 mm, and the diameter of each hole is 1 mm~3 mm. The steel sheet pile 7 has a width B of 400 mm, a height H of 240 mm and a thickness t of 9.2 mm.

In step S23, a temporary intercepting ditch 11 is excavated 2~3 meters above the steel sheet pile 7, a soil boss 12 is arranged on one side, which is close to the steel sheet pile 7, of the temporary intercepting ditch 11, the soil boss 12 is inclined by 3°~6° towards the temporary intercepting ditch 11, and the waterproof geotextiles 13 are paved on the existing side slope 5, the temporary intercepting ditch 11 and the soil boss 12.

In step S3, the excavation stages n of the first sub-level construction area 1 is determined, excavating transversely and in steps the first sub-level construction area from top to bottom in the first sub-level construction area 1 to form a stepped slope 14. The excavation stages n of first sub-level construction zone 1 is determined by a height h of the first sub-level construction area 1 and the paving thickness to f the paved first geogrid 19 in the following formula $$n = \frac{h}{t}.$$

The height h of the first sub-level construction area 1 is 2.7 m, the paving thickness t of the first geogrid 19 is 0.5 m, and the excavation stages n is 5. A layer of waterproof layer 15 is arranged on the stepped slope 14 of the first sub-level construction area 1, and waterproof geotextile is used as the waterproof layer 15. A gravel layer 16 is paved on the waterproof layer 15, and the gravel layer 16 was made of single graded crushed stone having a grain size of 2 cm and has a thickness of 10 cm.

The first geogrid 19 has a paving thickness t of 0.1 m to 1 m. In terms of slope stability, the smaller the paving thickness t is, the more stable it is. However, in terms of construction period and engineering cost, the smaller the paving thickness t is, the longer the construction period is, and the higher the engineering cost is. The paving thickness r of the first geogrid 19 in the embodiment is set to be 0.5 m in consideration of the slope stability and the construction period and the engineering cost. The width of the stepped slope 14 is 0.55 m, which is determined by the gradient of the embankment and the paving thickness t after the embankment is expanded.

In step S4, the geogrid reinforcement layer 17 is filled on the gravel layer 16 in a layered manner, and the slope protection structure 18 is installed in the filling process. The concrete operation of filling the geogrid reinforcement layer 17 and installing the slope protection structure 18 is as follows.

In step S41, impurities on the lower bearing layer are removed, the lower bearing layer is leveled, a first inner soil layer is paved by using equipment such as an excavator and the like with assistance of manpower, the first inner soil layer is compacted by using machinery, a first geogrid 19 on one side of the fork-shaped geogrid is paved on the top of the first inner soil layer, and a reinforcing part 20 is paved on the top and the side surface of the first inner soil layer.

In step S42, a first outer soil layer is paved and compacted on one side of the reinforcing part 20 which is away from the stepped slope 14, the outer side of the first outer soil layer is trimmed for arranging hollow bricks 21, a second geogrid 22 pre-embedded in the hollow brick 21 is paved to a preset position in the first outer soil layer, and secondarily filling and compacting to finish the first outer soil layer; a first geogrid 19 on the other side of the fork-shaped geogrid is paved on the top of the soil layer outside the first layer; the above steps are repeated, the geogrid reinforcement layer 17 is filled in layers, and the reinforcing part 20 is paved upwards in a step shape to be matched with the stepped slope 14. During filling and compacting, the rest part of the first geogrid 19 can be rolled up. When the inner soil layer is constructed, the rolled up part of the first geogrid is placed on the outer soil layer. When the outer soil layer is constructed, the rolled up part of the first geogrid is placed on the inner soil layer. The bottom of the geogrid reinforcement layer 17 is paved with a fork-shaped geogrid.

Figure 11:
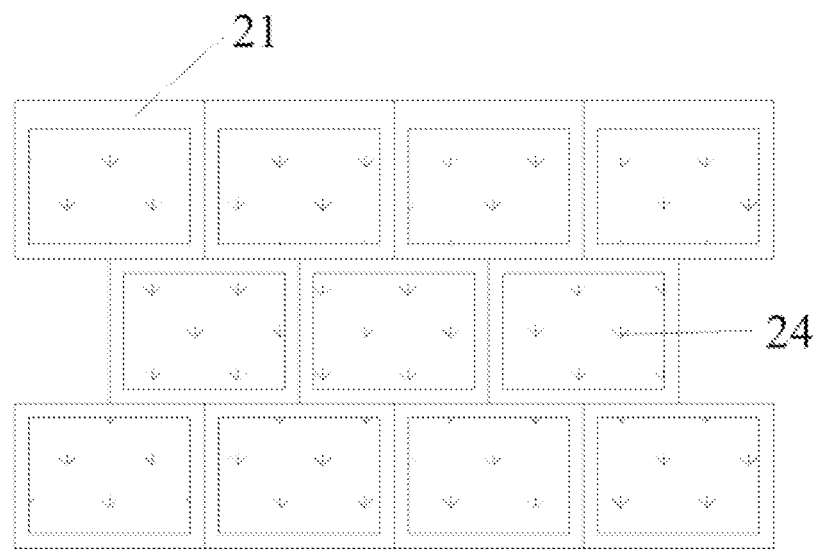
FIG. 11 is a layout view of hollow tiles according an embodiment of the present disclosure.

In step S43, the geogrid reinforcement layer 17 is filled and compacted from bottom to top and from left to right, and a slope protection structure 18 is installed until the geogrid reinforcement layer is fully paved; two adjacent first geogrids 19 on the left and the right are connected by adopting manual interlocking; the hollow bricks 21 are arranged in steps on the surface of the geogrid reinforcement layer 17 in a staggered manner through manual paving, the hollow bricks 21 on the upper and lower adjacent layers are mutually buckled, and soil 23 mixed with green planting seeds is filled in the hollow bricks 21, as shown in FIG. 11.

In step S5, wet pre-sedimentation construction is performed on backfill soil in the first sub-level construction area 1. The water supply pipe 27 is arranged at the top of the slope protection structure 18 in the first sub-level construction area 1, a spray head 28 is arranged at intervals of 3~7 meters on the water supply pipe 27 along the longitudinal direction of the road, water is sprayed to the top of backfill soil and the slope protection structure 18 through the water supply pipe 27 and the spray head 28, and then the water is guided out through the gravel layer 16 paved at the bottom of the backfill soil, so that the pre-sedimentation of the backfill soil can be carried out. After the construction is completed, the water supply pipe 27 and the shower head 28 are removed.

In step S6, the steel sheet piles 7 are pulled out in batches in a segmented interval manner through machines such as a vibrating hammer and a crane, slurry is injected into gaps left after the steel sheet piles 7 are pulled out through the slip-casting pipes 8 respectively, and slip-casting is stopped when bottoms of the slip-casting pipes 8 are flush with the top of the constructed geogrid reinforcement layer 17.

In step S7, the second sub-level construction area 2, the third sub-level construction area 3 and the fourth sub-level construction area 4 are sequentially constructed from bottom to top according to the steps S2 to S6; when the transverse horizontal distance between the sub-level construction area and the top of the existing side slope is smaller than the horizontal advance distance (3 m) the steel sheet pile 7 is not enabled to be driven. Namely, the fourth sub-level construction area 4 is constructed according to steps S3 to S5.

In step S8, the crane, the rammer and other mechanical equipment are used for carrying out heavy-hammer tamping construction on a tamping area 29 at the top of the geogrid reinforcement layer 17; the width of the tamping area is 4 m, and the depth thereof is 3 m~5 m.

Figure 12:
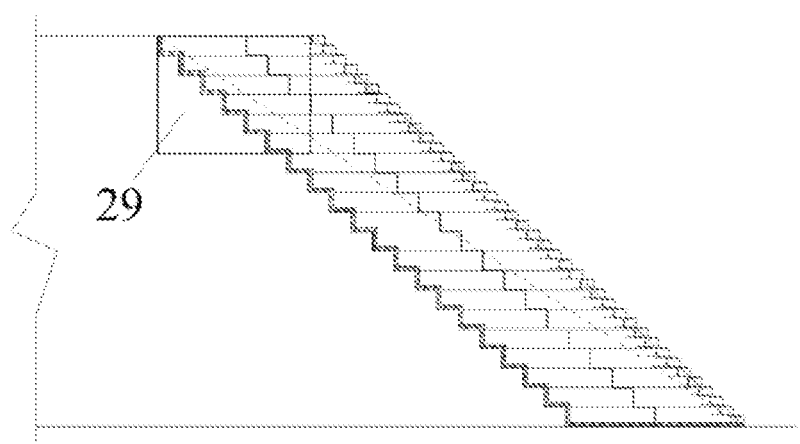
FIG. 12 is a side view of completing construction of the in-situ reconstruction and extension structure of an embankment according an embodiment of the present disclosure.

In step S9, the slope bottom drainage ditch 30 is constructed at the bottom of the extension side slope. The constructed effect is shown in FIG. 12.

Figure 13:
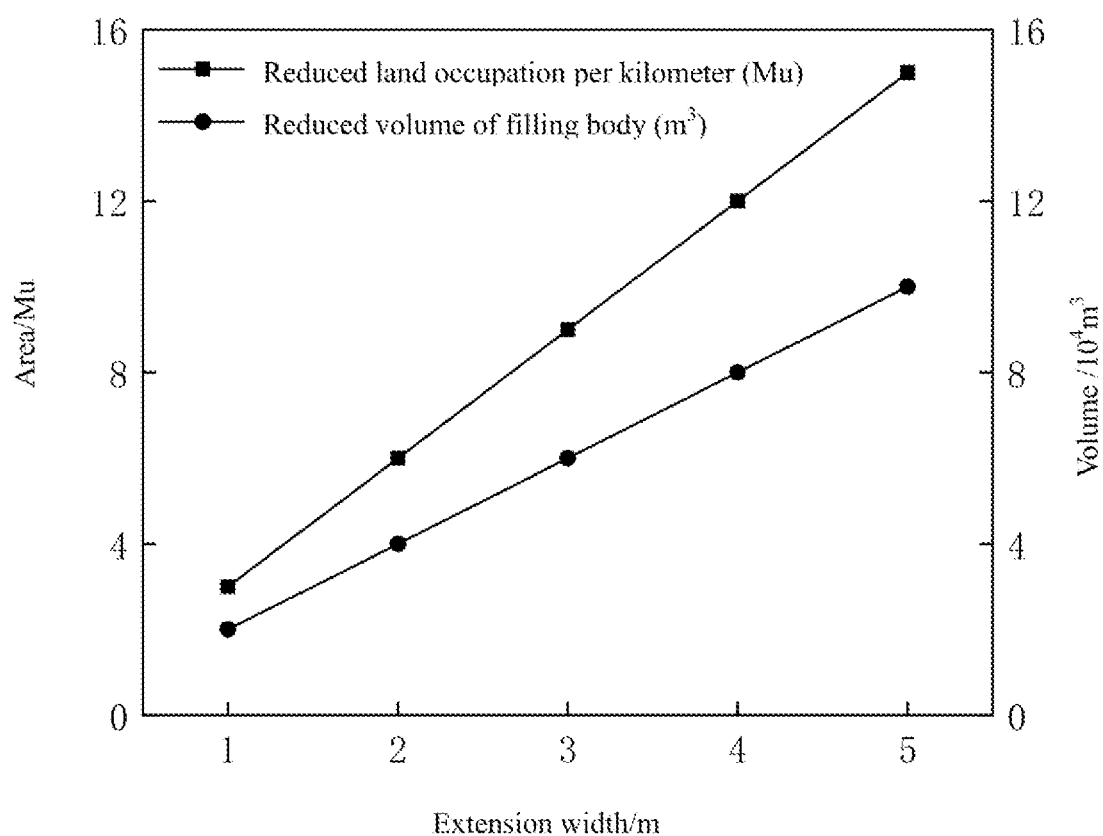
FIG. 13 is a data graph showing both a reduced footprint per kilometer and a reduced volume of a filling body per kilometer in accordance with an embodiment of the present disclosure.

Compared with the existing ex-situ extension after calculation, under the condition of taking single-side extension of 4 m and double-side extension of 8 m, the land occupation of each kilometer can be reduced by 12 mu (Chinese unit of land measurement, 1 mu is approximately equal to 666.7 square meters), and the volume of a filling body is reduced by 8 ten thousand m$^3$, which effectively improves the land utilization rate and reduces costs of a large amount of land occupation, as shown in FIG. 13.

The embodiment of the disclosure realizes the whole reconstruction and extension under the premise of high efficiency, safety, low cost and reduction of a large amount of occupied land by the anchoring system, the drainage system, the customized geogrid and the whole construction flow. By means of the reinforcing part of the fork-type geogrid, the shear strength of the embankment is improved, the gradient of the embankment can be increased and be kept stable after the embankment is expanded. And, according to different extension width selection, the gradient ranges from 1:1.5 to 1:1, so the extra occupied area and the extra filling volume required by the extension are reduced, the limit of surrounding buildings and terrains on the extension engineering is reduced, and the land occupation cost is reduced.

The foregoing description is only of the preferred embodiments of the present disclosure and is not intended to limit the scope of the present disclosure. Any modification, equivalent replacement, improvement, etc. made within the spirit and principles of the present disclosure are included in the protection scope of the present disclosure.

What is claimed is:

1. An in-situ reconstruction and extension structure of an embankment, comprising:
    a stepped slope, wherein the stepped slope is formed by excavation on an existing side slope, a gradient of the stepped slope is the same as a gradient of an extension side slope, the stepped slope is intersected with each of a top plane and a bottom plane of the existing side slope; and
    a toe of the existing side slope is taken as a toe of the extension side slope, and the gradient of the extension side slope is determined according to a position of the toe and an expanded width of the extension side slope;
    wherein an outer side of the stepped slope is filled with a geogrid reinforcement layer in a layered manner, and a slope protection structure is arranged on an outer side of the geogrid reinforcement layer to form the extension side slope; and
    wherein a drainage system is arranged at a bottom of the extension side slope and configured for draining water seepage inside in-situ reconstruction and extension structure of an embankment,
    wherein excavation of the stepped slope starts from the toe of the existing side slope and extends towards an inner side of the embankment to divide the embankment into a plurality of sub-level construction areas; and
    before the excavation of the stepped slope, a top of a tail end of each of the plurality of sub-level construction areas has steel sheet piles punched therein and slip-casting pipes are prefabricated at a corner of the steel sheet piles.

2. The in-situ reconstruction and extension structure of the embankment according to claim 1, wherein a fork-shaped geogrid is paved in soil layers of the geogrid reinforcement layer, the fork-shaped geogrid is vertically provided with a reinforcing part, first geogrids are arranged on two sides of the reinforcing part in a staggered manner, the first geogrids are paved between every adjacent two layers of the soil layers of the geogrid reinforcement layer, and the reinforcing part is paved upwards in a step shape and is matched with the stepped slope.

3. The in-situ reconstruction and extension structure of the embankment according to claim 2, wherein a thickness of the reinforcing part is 2~3 times a thickness of each of the first geogrids.

4. The in-situ reconstruction and extension structure of the embankment according to claim 1, wherein the gradient of the extension side slope ranges from 1:1.5 to 1:1.

5. The in-situ reconstruction and extension structure of the embankment according to claim 1, wherein the slope protection structure comprises:
   hollow bricks arranged on the stepped slope at the outer side of the geogrid reinforcement layer in a staggered manner; and
   second geogrids, wherein one end of each of the second geogrids is fixed inside a corresponding one of the hollow bricks, and an other end of the second geogrid extends into a corresponding one of soil layers of the geogrid reinforcement layer.

6. The in-situ reconstruction and extension structure of the embankment according to claim 5, wherein diagonal corners, which are in contact with upper and lower adjacent ones of the hollow bricks respectively, of each of the hollow bricks are respectively provided with an upper overlapping structure and a lower overlapping structure that are extended vertically outwards.

7. The in-situ reconstruction and extension structure of the embankment according to claim 1, wherein a temporary intercepting ditch is dug above top ends of the steel sheet piles, and waterproof geotextiles are paved on a surface of the existing side slope and on a surface of the temporary intercepting ditch.

8. The in-situ reconstruction and extension structure of the embankment according to claim 7, wherein a soil boss is arranged on one side of the temporary intercepting ditch close to the steel sheet piles, and the soil boss is inclined by 3°~6° towards the temporary intercepting ditch; and the waterproof geotextiles are paved on the surface of the existing side slope, on a surface of the temporary intercepting ditch and on a surface of the soil boss.

9. The in-situ reconstruction and extension structure of the embankment according to claim 1, wherein the drainage system comprises:
   a waterproof layer arranged on a surface of the stepped slope;
   a gravel layer paved on a top of the waterproof layer; and
   a bottom drainage ditch arranged at a bottom of the embankment.

10. A construction method of the in-situ reconstruction and extension structure of the embankment according to claim 1, comprising steps of:
    S1, cleaning up an existing embankment, removing impurities on a surface of the existing side slope, making an auxiliary line parallel to the extension side slope from a top of the existing side slope, and dividing the embankment into a plurality of sub-level construction areas from the toe of the existing side slope taken as a starting point towards an inner side of the embankment;
    S2, punching the steel sheet piles into the top of the tail end of one sub-level construction area, which is closest to the starting point, of the sub-level construction areas;
    S3, excavating transversely and in steps the one sub-level construction area from top to bottom along the auxiliary line to form a section of the stepped slope, paving a waterproof layer on a surface of the section of the stepped slope, and paving a gravel layer on the waterproof layer;
    S4, filling the geogrid reinforcement layer on the gravel layer in a layered manner, and installing the slope protection structure in a filling process;
    S5, carrying out wet pre-sedimentation construction on backfill soil in the one sub-level construction area;
    S6, pulling out the steel sheet piles in a segmented interval manner, simultaneously injecting slurry into gaps left after the steel sheet piles are pulled out through slip-casting pipes respectively, and stopping slip-casting when bottoms of the slip-casting pipes are flush with a top of the geogrid reinforcement layer constructed;
    S7, constructing sequentially others of the sub-level construction areas from bottom to top according to steps S2~S6; when a horizontal distance between the sub-level construction areas and the top of the existing side slope is smaller than a horizontal advance distance, the steel sheet piles need not to be punched into the one sub-level construction area;
    S8, tamping a portion of the geogrid reinforcement layer which has a distance 3 m~5 m from the top of the existing side slope; and
    S9, constructing a bottom drainage ditch at the bottom of the extension side slope.

11. The construction method of the in-situ reconstruction and extension structure of the embankment according to claim 10, wherein the S2 comprises:
    S21, installing a guide frame at a top of the one sub-level construction area;
    S22, forming a steel sheet pile section by connecting some of the steel sheet piles through locking parts between every two adjacent steel sheet piles of said some of the steel sheet piles, and repeating the operation of forming the steel sheet pile section to form a plurality of steel sheet pile sections, punching the steel sheet pile sections into the one sub-level construction area according to a step shape, setting a reserved segmented interval of 15 cm~30 cm between every adjacent two steel sheet pile sections, and punching the steel sheet piles into the one sub-level construction area by a depth of 6 m~8 m; prefabricating the slip-casting pipes at trapezoid vertex corners of the steel sheet piles respectively, and extending bottoms of the slip-casting pipes out of the steel sheet piles respectively;
    S23, excavating a temporary intercepting ditch above the steel sheet piles, arranging a soil boss on one side, close to the steel sheet piles, of the temporary intercepting ditch, wherein the soil boss is inclined by 3°~6° towards the temporary intercepting ditch; paving waterproof geotextiles on the surface of the existing side slope, on the surface of the temporary intercepting ditch, and on the surface of the soil boss.

12. The construction method of the in-situ reconstruction and extension structure of the embankment according to claim 10, wherein paving the geogrid reinforcement layer and the slope protection structure in S4 comprises:
    cleaning and leveling a lower bearing layer, paving and compacting a first inner soil layer at a set position of the lower bearing layer, paving a first geogrid at one side of a fork-shaped geogrid at a top of the first inner soil layer, paving a reinforcing part at the top of the first inner soil layer and a side surface of the first inner soil layer, paving a first outer soil layer at one side of the reinforcing part which is away from the stepped slope, compacting and trimming an outer side of the first outer soil layer for arranging hollow bricks, paving a second geogrid pre-buried in the hollow bricks to a preset position in the first outer soil layer, and secondarily filling and compacting to finish the first outer soil layer; paving the first geogrid at an other side of the fork-shaped geogrid at a top of the first outer soil layer; repeating above operations; filling the geogrid reinforcement layer in layers, and paving the reinforcing part upwards in a step shape to be matched with the stepped slope; arranging the hollow bricks on a stepped surface of the geogrid reinforcement layer in a staggered manner, mutually buckling adjacent upper and lower ones of the hollow bricks, and filling soil mixed with green planting seeds in the hollow bricks.

13. The construction method of the in-situ re-construction and extension structure of the embankment according to claim 10, wherein in S3, excavation stages n of each of the sub-level construction areas is determined by a height h of the sub-level construction area and a vertical spacing t of the first geogrid in a following formula:

$$n = \frac{h}{t}.$$

14. The construction method of the in-situ re-construction and extension structure of embankment according to claim 10, wherein the first geogrid has a thickness t that ranges from 0.1 m to 1 m.

* * * * *